(12) United States Patent
Goodman

(10) Patent No.: US 6,817,017 B2
(45) Date of Patent: Nov. 9, 2004

(54) UNIVERSAL INTERFACE SYSTEM

(75) Inventor: David A. Goodman, Chicago, IL (US)

(73) Assignee: Leotel, Technologies, Inc., Des Plaines, IL (US)

( * ) Notice: Subject to any disclaimer, the term of this patent is extended or adjusted under 35 U.S.C. 154(b) by 542 days.

(21) Appl. No.: 09/792,773

(22) Filed: Feb. 23, 2001

(65) Prior Publication Data

US 2002/0156928 A1 Oct. 24, 2002

Related U.S. Application Data

(60) Provisional application No. 60/199,293, filed on Apr. 24, 2000.

(51) Int. Cl.[7] .................................................. G06F 9/00
(52) U.S. Cl. ........................ 719/310; 719/319; 708/400; 708/819; 708/820; 708/821
(58) Field of Search ................................ 768/400, 401, 768/402, 403, 404, 405, 819, 828, 821; 709/310, 311, 319, 320, 328

(56) References Cited

U.S. PATENT DOCUMENTS 5,986,709 A * 11/1999 Lee .......................... 375/240.2
6,408,321 B1 * 6/2002 Platt ............................ 708/520
6,442,749 B1 * 8/2002 Hirao et al. ................. 717/170
6,487,656 B1 * 11/2002 Kim et al. ...................... 713/2
6,496,795 B1 * 12/2002 Malvar ........................ 704/203
6,578,142 B1 * 6/2003 Anderson et al. .............. 713/2
6,591,284 B1 * 7/2003 Brockmeyer et al. ....... 708/400
6,658,554 B1 * 12/2003 Moshovos et al. .......... 712/216

* cited by examiner

Primary Examiner—Meng-Al T. An
Assistant Examiner—The Thanh Ho

(57) ABSTRACT

This invention provides a universal interface system that is capable of launching software applications across operating system platforms. For example, the universal interface system allows a computer using a Microsoft Windows operating system to launch and execute software applications that were written for a UNIX operating system environment. Conversely, the universal interface system allows software applications written for a Linux operating system environment to be launched and operating in a Sun Solaris operating system environment. The universal interface system may interface between the BIOS and the operating system or operate on top of the operating system.

80 Claims, 4 Drawing Sheets

US 6,817,017 B2

UNIVERSAL INTERFACE SYSTEM

CLAIM OF PRIORITY

The following co-pending and commonly assigned U.S. provisional patent application was filed on Apr. 24, 2000, having U.S. Provisional Patent Application Ser. No. 60/199,293, entitled "A Universal Interface System."

BACKGROUND OF THE INVENTION

1. Field of the Invention

This invention relates to a system for providing a universal interface system. Specifically, the invention relates to a software interface for proprietary hardware that may act between the Basic Input Output System (BIOS) and the operating system or specific applications, or between the operating system and specific applications.

2. Related Art

When a personal computer is initially started, the boot process executes a series of complex instructions to ensure that the components are properly functioning. The computer executes a power-on self test ("POST") to check the functionality of the central processing unit ("CPU") and the memory. In the initiation of a POST, an electrical signal following a permanently programed path to the CPU clears any leftover data from the internal proprietary memory registers. The discrete signal also resets the program counter to typically the hexadecimal number of F000. This number instructs the CPU of the next instruction that requires processing. This address is the start of the boot program typically stored in read only memory (ROM) that contains the basic input/output system ("BIOS"). The BIOS boot program invokes a series of systems checks including reading code located in various memory locations and checking the code against identical records stored in the BIOS chip set or some other CMOS chip.

The boot operation typically performs the POST and searches for the operating system. Once the operating system is found, the system files are read and copied into random access memory ("RAM"). Typically, each computer has only one operating system. In a disk operating system environment, once the boot record loads the IO.SYS files into RAM the SYSINIT routine is called that manages the remaining part of the boot process. The SYSINIT loads the MSDOS.SYS into RAM and works to manage the files, execute programs and respond to hardware commands. Other operating system files that may be launched are COMMAND.COM and AUTOEXEC.BAT.

Due to interoperability problems there exists a need for a software system to interface between the BIOS and the operating system. For example, often there is a need to operate a Windows based application contemporaneously with a UNIX based application. Without interface software, a Windows operating system will not execute a UNIX application and vice versa. There also is a need for a software system interface to act between the microprocessor BIOS and specific application or between the operating system and specific applications. These problems often exist when computer systems seek to launch or share programs across a variety of platforms and operating system releases.

BRIEF DESCRIPTION OF THE FIGURES

The invention can be better understood with reference to the following figures. The components in the figures are not necessarily to scale, emphasis instead being placed upon illustrating the principals of the invention. Moreover, in the figures, like reference numerals designate corresponding parts throughout the different views.

SUMMARY

This invention provides a universal interface system that is capable of launching software applications across a variety of operating system platforms. For example, the universal interface system allows a computer using a Microsoft Windows operating system to launch and execute software applications that were written for a Novelle, UNIX, ATM, etc. operating system environment. Conversely, the universal interface system allows software applications compiled for one operating system environment to be launched and operate in either the same or a second and different operating system environment where the software application is not compiled to operate in. The universal interface system may interface between the proprietary integrated circuits, the BIOS and the operating system(s) or operate simultaneously with another operating system.

The universal interface system implements three math tables that create equations capable of manipulating the software application's instructions such that the functionality of the application shells operate independent of the operating system. The first math table K implements the memory allocation and memory functionality. The universal interface system then implements a second math table K(x) on top of the first math table K using functions from the first math table. Operation of the third math table's formulas involves loading the variables into memory will equate the values that run in the shells. The first math table K equates to f(x) in the following equations and is the function of a variable where K is the math table of that variable. The variable f(x) is typically in hexadecimal format and the input/output number is typically in a decimal format. The actual input/output that the firmware uses is typically in a decimal format and the software values in a hexadecimal format.

DETAILED DESCRIPTION OF THE PREFERRED EMBODIMENTS

Figure 1:
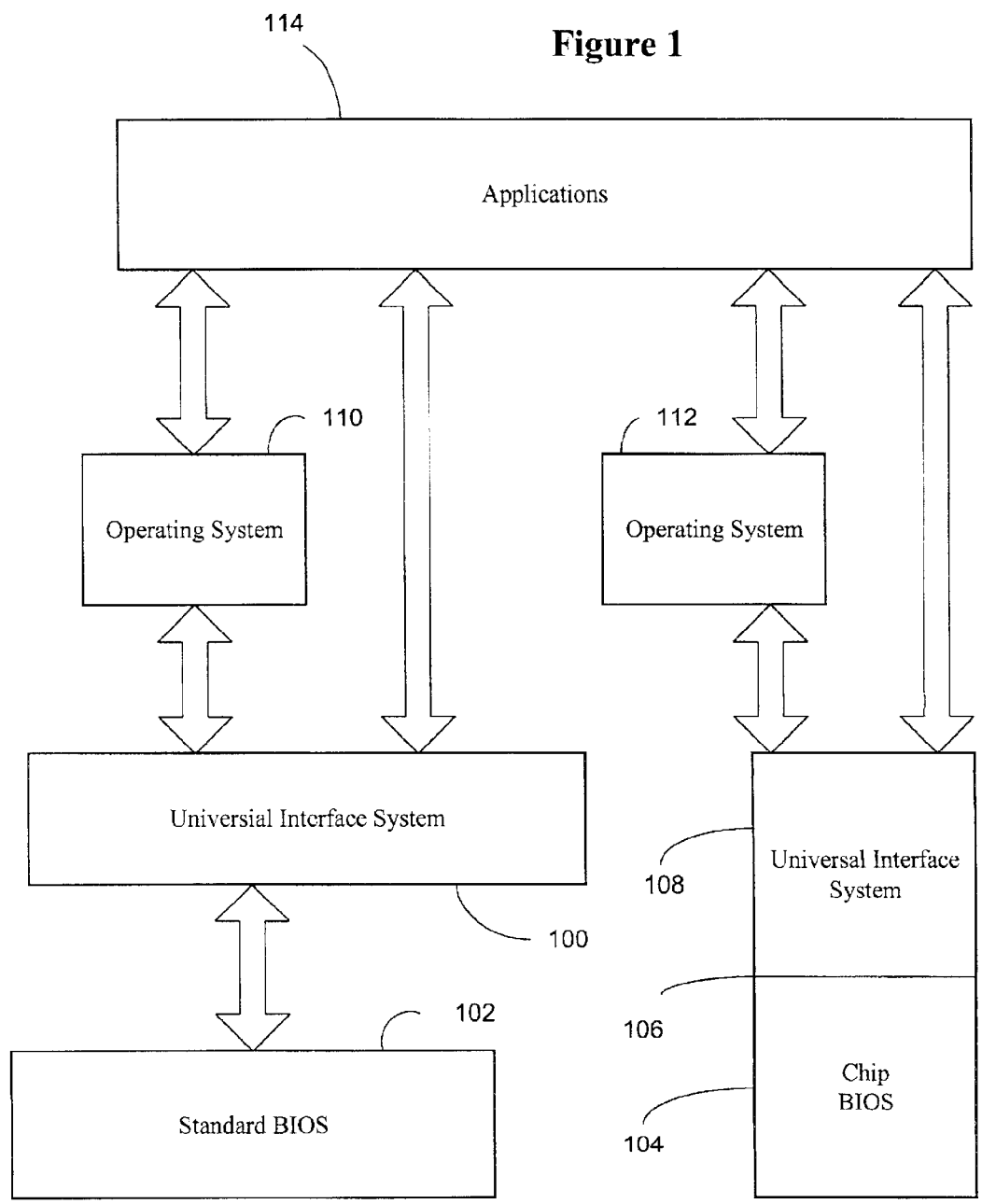
FIG. 1 illustrates a block diagram of the universal interface system relative to the chip Basic Input Output System (BIOS), operating system, and/or applications operating via the operating system of the microprocessor.

The universal interface application may be implemented during the initial boot-up of a computer or on an operating computer. FIG. 1 illustrates a block diagram of the universal interface application relative to the chip Basic Input Output System (BIOS), operating system, and/or applications operating via the operating system of the microprocessor. The universal interface system 100 may interact with the standard BIOS 102 in a microprocessor or may act as firmware BIOS 104 on a specialized chip 106 designed to optimize the universal interface system 108 code. The universal interface system 100 or 108 may also interact with various operating systems 110 and 112. Or the software applications 114 may interact with the operating systems 110 and 112 or directly with the universal interface system 100 and 108.

Figure 2:
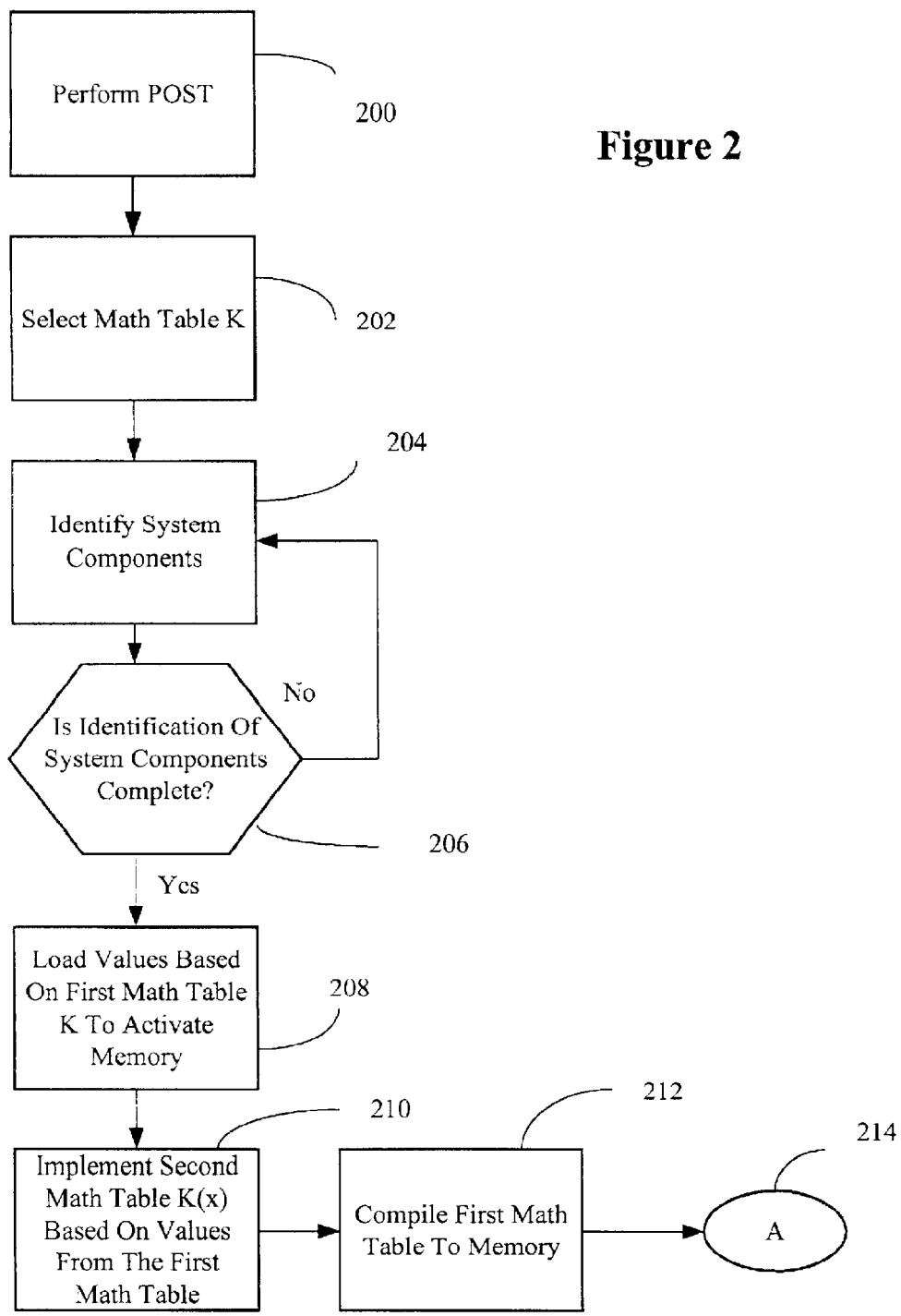
FIG. 2 illustrates a block diagram of the execution of the universal interface system during the power-on self test ("POST") operation.

FIG. 2 illustrates a block diagram of the execution of the universal interface application during the power-on self-test ("POST") operation. When a computer is initially turned on, it performs a POST operation 200. If the universal interface system is installed on the computer, during the POST operation additional tasks are performed. A first math table K 202 is selected for the BIOS, and next the system components 204 are identified.

The first math table uses the Feigenbaum constants to determine values where $f(x)=\alpha x(1-x)$, and where a is a constant. The interval [0,1] is mapped into itself by $f$ for each value of a $\epsilon$[0,4]. These functions, parametrized by the constant $\alpha$, is known as a family of logical maps. The 1-cycles of $f$ or the fixed points of $f$ are obtained by solving $x=f(x)$. Therefore, for $x=0$ (attracts for $\alpha<1$ and repels for $\alpha>1$), and $$x = \frac{a-1}{a}$$

(attracts for $1<\alpha<3$ and repels for $\alpha>3$).

The 2-cycle or the fixed points of the iterate $f^2$ that are not fixed points of $f$ are obtained from solving:

$x=f^2(x)$ $x=f(x)$ obtains the 2-cycle fixed points $$x = \frac{a = 1 \pm (a^2 - 2a - 3)^{\frac{1}{2}}}{2a}$$

This equation produces values that attract for $3<\alpha<1+\sqrt{6}$ and repels for $\alpha>1+\sqrt{6}$. For $\alpha>1+\sqrt{6}=3.4495$, an attracting 4-cycle emerges. A 4-cycle may be obtained numerically by solving:

$x=f^4(x)$ $x=f^2(x)$

The 4-cycle attracts for 3.45595 . . . <a<3.5441 . . . and repels for a>3.5441 . . . For $\alpha>3.5441$ . . . , an attracting 8-cycle emerges. An 8-cycle may be obtained numerically by solving:

$x=f^8(x)$ $x=f^4(x)$

The 8-cycle attracts for 3.5441 . . . <$\alpha$<3.5644 . . . and repels for $\alpha>3.5644$ . . . This sequence of period doubling bifurcations stops short of 4. Letting:

$\alpha_0=1, \alpha_1=3, \alpha_2=1+\overline{\sqrt{6=3.4495...}}, \alpha_3=3.5441 \ldots, \alpha_4 3.5644 \ldots$ denotes the cascade of bifurcations.

Figure 3:
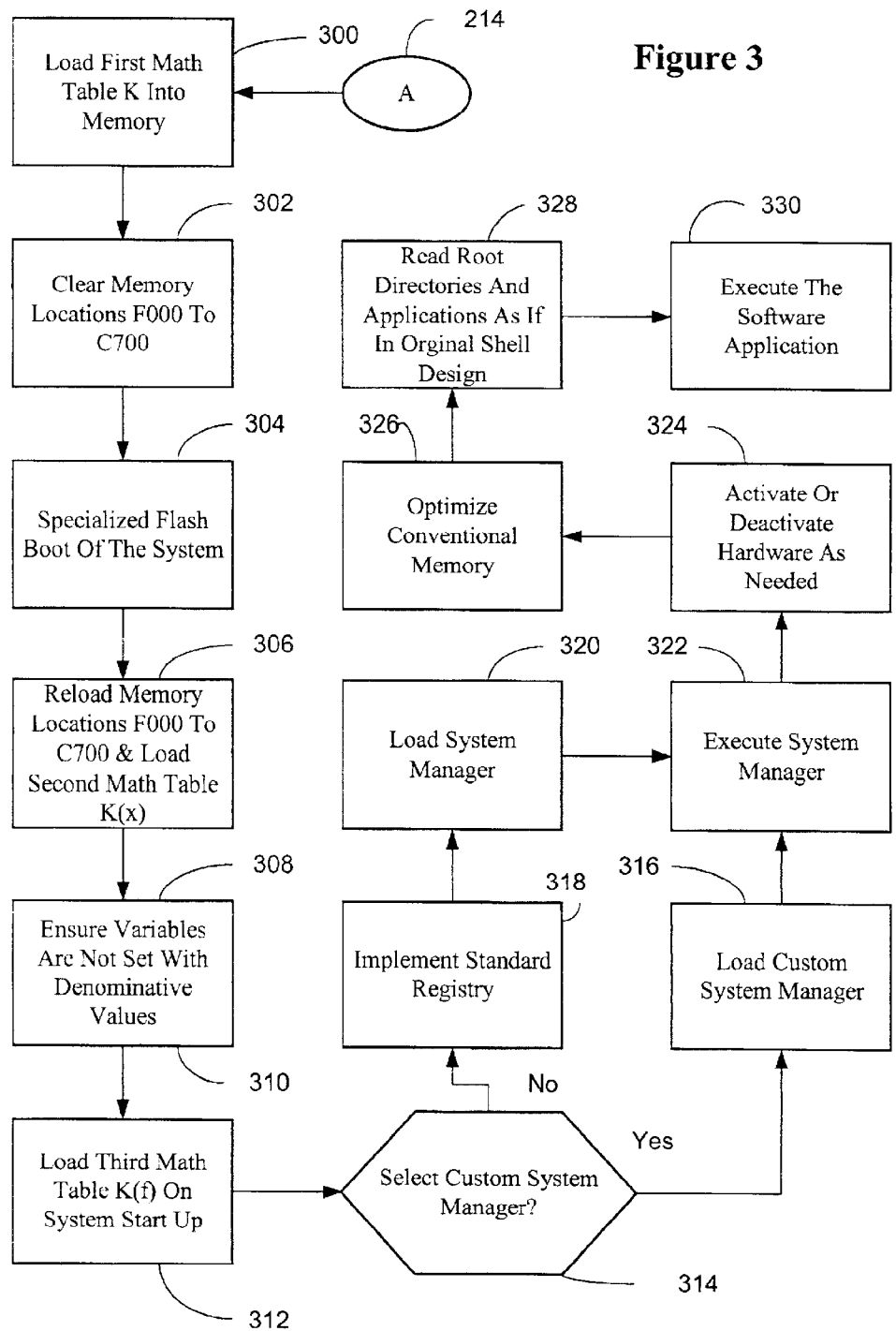
FIG. 3 illustrates a block diagram of the execution of the universal interface system during the power-on self test ("POST") operation.

If the system component identification is not complete 206, additional steps to identify all the system components 204 is performed. Values are loaded 208 into the system based on the math table K in memory. The first math table K implements the memory allocation and functionality. The universal interface system then implements a second math table K(x) 210 on top of the first math table K using functions from the first math table. The first and the second math table are then compiled 212 and stored in memory. Connector A 214 links FIGS. 2 and 3.

The first math table K is typically loaded into random access memory (RAM) 300 and the memory locations F000 to C700 are cleared 302. A specialized flash boot of the computer system 304 is performed. The specialized flash boot clears out certain memory locations for storage or new functions of the math tables. The universal interface system reloads the memory locations F000 to C700 for storage of the second math table K(x) 306.

For the second math table K(x), the Madelung's constant equations are used.

$$M_2 = \sum_{i,j=-\infty}^{\infty} \frac{(-1)^{i+j}}{\sqrt{i^2 + j^2}}$$

$$M_2 = 4(\sqrt{2}-1) \cdot \partial\left(\frac{1}{2}\right) \cdot \beta\left(\frac{1}{2}\right) = -1.6155426267 \ldots$$

$$M_3 = \sum_{i,j,k=-\infty}^{\infty} \frac{(-1)^{i+j+k}}{\sqrt{i^2 + j^2 + k^2}}$$

$$M_3 = 12x \sum_{m,n,=1}^{\infty} \operatorname{sech}^2\left[\frac{x}{2}\sqrt{(2m-1)^2 + (2n-1)^2}\right] = -1.7475645946 \ldots$$

The universal interface system ensures that the variables are not set with denominative values 310 and loads the third math table K(f) typically upon the start up of the computer system 312. However, for execution of an application, the third math table K(f) is not limited only upon start up of the computer but may be loaded after the computer is operational. Operation of the third math table's formulas involves loading the variables into memory, typically RAM, that will equate the values that run in the shells. The first math table K equates to f(x) in the following equations and is the function of a variable where K is the math table of that variable. The variable f(x) is typically in hexadecimal format and the input/output number is typically in a decimal format. The actual input/output that the firmware uses is typically in a decimal format and the software values in a hexadecimal format. The universal interface system will decide if the attached peripheral devices may be determined that are connected to the CMOS chip found in almost all computer systems. The universal interface system will use an extremely large number such as infinity over sigma n equal to 1 or the derivative of n equal to 1, as long as it's a positive integer value.

If the series converges in the generation of the third math table, the remainder $R_N$ equals the series of $-S_N$, the exact sum of an infinite series. The third math table may be utilized for the system manager and operates according to implementation of the following sets of formulas. The value of x in the right side of the following Fourier Transform, Cosine Transform and Sine Transform equations respectively, is the value supplied from operation of the second math table K(x).

$f(x)=1/x(2x)x \; x \; g(t)e^{-(itx)}dt$ $f(x)=x(2/x)x \; x \; g(x)\cos(xt)dt$ $f(x)=x(2/x)x \; x \; g(x)\sin(xt)dt$ The Fourier Transform is best utilized in transmitting a data packet, the Cosine Transform is best used when precise bandwidths are required, while the Sine Transform is used for data compression. Both the Cosine and Sine Transforms may be used interchangeably.

The p-Series convergence is determined by:

$$\sum_{n=1}^{\infty} 1/n^p = 1/1^p + 1/2^p + 1/3^p + \ldots$$

where p>0 by definition. If p>1 then the series converges. This occurs for approximately 90% of the programs, where p<=1, then the series diverges, and the program will not operate.

The nth-Term is tested for divergence such that if the sequence $\{a_n\}$ does not converge to zero, then the series $$\sum_{n=1}^{\infty} a_n$$

diverges.

The special cases of Fourier Integral is used where x is the hexadecimal value. If $f(x)=f(-x)$ then:

$f(x)=2/PI\int_0^\infty \cos xy \, dy \int_0^\infty f(t)\cos yt \, dt$

Where, if $f(-x)=-f(x)$ then:

$f(x)=2/PI\int_0^{2\infty} \sin xy \, dy \int_0^\infty \sin yt \, dt$

The integral test is used to provide the value of n in terms of i. If for all n>=1, then $f(n)=\alpha_n$ and $f$ is positive and continuous, then:

$$\sum_{n=1}^{\infty} a_n \text{ and } \int_1^{\infty} a_n$$

and convergence occurs. If the above series converges, then the remainder $R_N=S-S_N$, where S is the exact sum of the infinite series and $S_N$ is the sum of the first N terms of the series. $R_N$ is bounded by:

$0<=R_N<=\int (N \ldots \infty)f(x)dx$

The third math table K(f) may be created using the following formulas. Using the following Fourier and Inverse Fourier Transforms where i is the shell value needed to run the operation. The Fourier Transforms are the last value added before the shell integration.

$$f(x) = 1\sqrt{(2\pi)} \int_\infty^\infty g(t)e^{\wedge(itx)}dt$$

$$g(x) = 1\sqrt{(2\pi)} \int_\infty^\infty f(t)e^{\wedge(itx)}dt$$

In a Microsoft Windows environment, the system manager is used to manipulate the relationship between the firmware interrupts and the application source. The universal interface system queries whether a custom system manager is to be loaded 314. If a custom system manager is selected 316, the custom system manager is loaded 316 and executed 318. If a custom system manager is not selected 314, the standard registry is implemented 320 and a standard system manager is loaded 322. Once the custom system manager is executed 318 or the standard system manager is loaded 322, a third math table K(f) is created 324. In a non-Windows operating system environment, the need for a system manager is not required and a custom system manager may be implemented for convenience.

The universal interface system activates or deactivates system hardware or firmware as needed 326 and optimizes conventional memory 328. The root directories are then read and any software applications are run as if in their original design shell 330. The software applications are then executed 332 when selected.

Although described with particular reference to implementation upon start up of a computer, the universal interface application may be implemented at any time during the operation of the computer. The implementation of the universal interface application may occur in firmware or software, and be capable of interfacing at the BIOS level or the operating system level. The universal interface system may also be implemented using a specialized integrated circuit with the system operating as the firmware for the integrated circuit. The universal interface system may also operate across a variety of operating systems and be able to translate software applications so that they can operate cross any operating system. Furthermore, the universal interface system is applicable to any system where it is desirable to implement a variety of cross operating system platforms.

Figure 4:
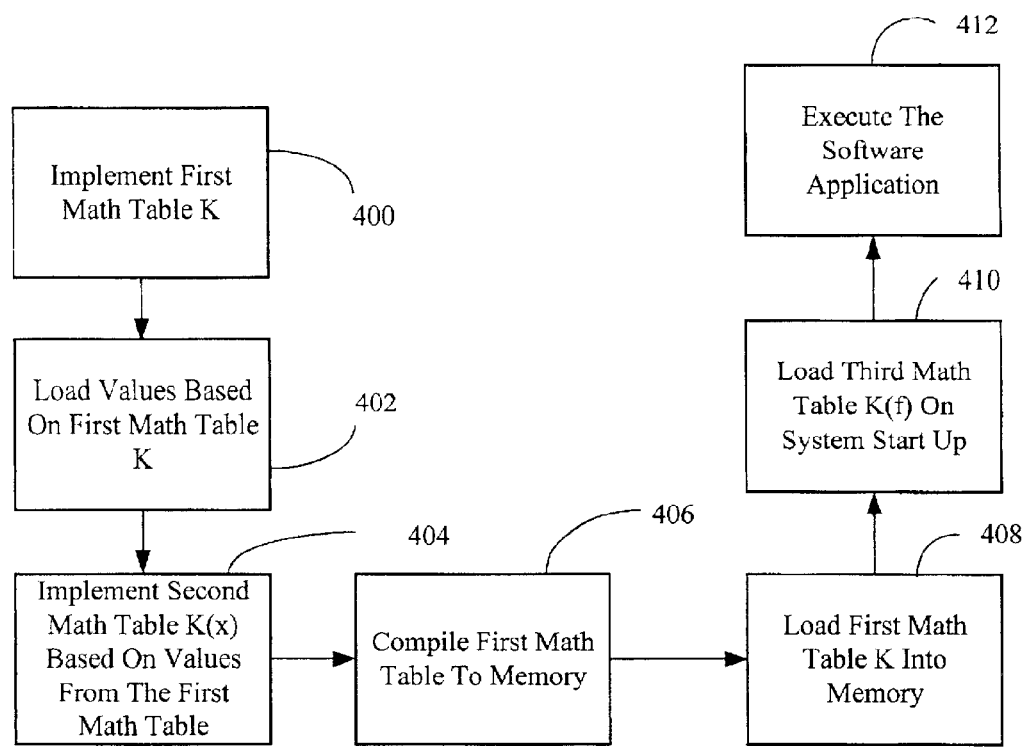
FIG. 4 illustrates a block diagram of the execution of software applications independent of the operating system.

FIG. 4 illustrates a block diagram of the execution of software applications independent of the operating system. A first math table K 400 is selected and implemented. The first math table uses the Feigenbaum constants to determine values where $f(x)=\alpha x(1-x)$, and where a is a constant. The interval [0, 1] is mapped into itself by $f$ for each value of a $\epsilon$[0, 4]. These functions, parametrized by the constant $\alpha$, is known as a family of logical maps. The 1-cycles of $f$ or the fixed points of $f$ are obtained by solving $x=f(x)$. Therefore, for x=0 (attracts for $\alpha<1$ and repels for $\alpha>1$), and $$x = \frac{a-1}{a}$$

(attracts for $1<\alpha<3$ and repels for $\alpha>3$).

The 2-cycle or the fixed points of the iterate $f^2$ that are not fixed points of $f$ are obtained from solving:

$x=f^2(x)$ $x=f(x)$ obtains the 2-cycle fixed points $$x = \frac{a = 1 \pm (a^2 - 2a - 3)^{\frac{1}{2}}}{2a}$$

This equation produces values that attract for $3<\alpha<1+\sqrt{6}$ and repels for $\alpha>1+\sqrt{6}$. For $\alpha>1+\sqrt{6}=3.4495$, an attracting 4-cycle emerges. A 4-cycle maybe obtained numerically by solving:

$x=f^4(x)$ $x=f^2(x)$

The 4-cycle attracts for 3.45595 . . . <a<3.5441 . . . and repels for a>3.5441 . . . For $\alpha>3.5441$ . . . , an attracting 8-cycle emerges. An 8-cycle may be obtained numerically by solving:

$x=f^8(x)$ $x=f^4(x)$

The 8-cycle attracts for 3.5441 . . . <$\alpha$<3.5644 . . . and repels for $\alpha>3.5644$ . . . This sequence of period doubling bifurcations stops short of 4. Letting:

$\alpha_0=1, \alpha_1=3, \alpha_2=1+\sqrt{6}=3.4495..., \alpha_3=3.5441 \ldots, \alpha_4 3.5644 \ldots$ denotes the cascade of bifurcations.

Values are loaded 402 into the system based on the math table K in memory. The first math table K implements the memory allocation and functionality. The universal interface system then implements a second math table K(x) 404 on top of the first math table K using functions from the first math table. The first and the second math table are then compiled 406 and 408 and stored in memory.

For the second math table K(x), the Madelung's constant equations are used.

$$M_2 = \sum_{i,j=-\infty}^{\infty} \frac{(-1)^{i+j}}{\sqrt{i^2+j^2}}$$

$$M_2 = (4\sqrt{2}-1) \cdot \partial\left(\frac{1}{2}\right) \cdot \beta\left(\frac{1}{2}\right) = -1.6155426267 \ldots$$

$$M_3 = \sum_{i,j,k=-\infty}^{\infty} \frac{(-1)^{i+j+k}}{\sqrt{i^2+j^2+k^2}}$$

$$M_3 = 12x \sum_{m,n=1}^{\infty} \mathrm{sech}^2\left[\frac{x}{2}\sqrt{(2m-1)^2+(2n+1)^2}\right] = -1.7475645946 \ldots$$

Operation of the third math table's formulas involves loading the variables into memory, typically RAM, that will equate the values that run in the shells. The first math table K equates to f(x) in the following equations and is the function of a variable where K is the math table of that variable. The variable f(x) is typically in hexadecimal format and the input/output number is typically in a decimal format. The actual input/output that the firmware uses is typically in a decimal format and the software values in a hexadecimal format. The universal interface system will use an extremely large number such as infinity over sigma n equal to 1 or the derivative of n equal to 1, as long as it's a positive integer value.

If the series converges in the generation of the third math table, the remainder $R_N$ equals the series of $-S_N$, the exact sum of an infinite series. The third math table may be utilized for the system manager and operates according to implementation of the following sets of formulas. The value of x in the right side of the following Fourier Transform, Cosine Transform and Sine Transform equations respectively, is the value supplied from operation of the second math table K(x).

$$f(x)=1/x(2x)x \times g(t)e^{-(itx)}dt$$

$$f(x)=x(2/x)x \times g(x)\cos(xt)dt$$

$$f(x)=x(2/x)x \times g(x)\sin(xt)dt$$

The Fourier Transform is best utilized in transmitting a data packet, the Cosine Transform is best used when precise bandwidths are required, while the Sine Transform is used for data compression. Both the Cosine and Sine Transforms may be used interchangeably.

The p-Series convergence is determined by:

$$\sum_{n=1}^{\infty} 1/n^p = 1/1^p + 1/2^p + 1/3^p + \ldots$$

where p>0 by definition. If p>1 then the series converges. This occurs for approximately 90% of the programs, where p<=1, then the series diverges, and the program will not operate.

The nth-Term is tested for divergence such that if the sequence $\{a_n\}$ does not converge to zero, then the series $$\sum_{n=1}^{\infty} a_n$$

diverges.

The special cases of Fourier Integral is used where x is the hexadecimal value. If $f(x)=f(-x)$ then:

$$f(x)=2/PI\int_0^\infty \cos xy\, dy \int_0^\infty f(t)\cos yt\, dt$$

Where, if $f(-x)=-f(x)$ then:

$$f(x)=2/PI\int_0^\infty \sin xy\, dy \int_0^\infty \sin yt\, dt$$

The integral test is used to provide the value of n in terms of i. If for all n>=1, then $f(n)=\alpha_n$ and $f$ is positive and continuous, then:

$$\sum_{n=1}^{\infty} a_n \text{ and } \int_1^\infty a_n$$

and convergence occurs. If the above series converges, then the remainder $R_N=S-S_N$, where S is the exact sum of the infinite series and $S_N$ is the sum of the first N terms of the series. $R_N$ is bounded by:

$$0<=R_N<=\int(N\ldots\infty)f(x)dx$$

The third math table K(f) may be created using the following formulas. Using the following Fourier and Inverse Fourier Transforms where i is the shell value needed to run the operation. The Fourier Transforms are the last value added before the shell integration.

$$f(x)=1\sqrt{(2\pi)}\int_\infty^\infty g(t)e^{-(itx)}dt$$

$$g(x)=1\sqrt{(2\pi)}\int_\infty^\infty f(t)e^{-(-itx)}dt$$

Once a third math table K(f) is created and loaded into memory 410, the software application may be executed independent of the operating system.

Furthermore, the universal interface system of the invention can be implemented in software, hardware, or a combination of hardware and software. In a preferred embodiment(s), selected portions of the universal interface system may be implemented in hardware and software. The hardware portion of the invention can be implemented using specialized hardware logic. The software portion can be stored in a memory and be executed by a suitable instruction execution system (microprocessor). The hardware implementation of the universal interface system may include any or a combination of the following technologies, which are all well known in the art: a discrete logic circuit(s) having logic gates for implementing logic functions upon data signals, an application specific integrated circuit ("ASIC") having appropriate logic gates, a programmable gate array(s) (PGA), a field programmable gate array (FPGA), etc.

Furthermore, the universal interface system software that comprises an ordered listing of executable instructions for implementing logical functions, may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory ("RAM"), a read-only memory ("ROM"), an erasable programmable read-only memory ("EPROM" or Flash memory) (magnetic), an optical fiber (optical), and a portable compact disc read-only memory ("CD-ROM") (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A universal interface application, comprising:
   loading values based on a first math table into memory where the first table uses Feigenbaum constants to determine values for the first math table;
   loading values from implementation of a second math table using functions from the first math table into the memory;
   loading values from implementation of a third math table into the memory; and
   executing a software application by implementing functions from the first, second and third math tables.

2. The universal interface application of claim 1, where the Feigenbaum constants are parameterized by logical maps.

3. The universal interface application of claim 1, where the Feigenbaum constants have fixed points $f$ obtained by solving the equation $x=f(x)$.

4. The universal interface application of claim 3, where a hexadecimal value represents $f(x)$.

5. The universal interface application of claim 3, where input/output values of the first math table are decimal values.

6. The universal interface application of claim 1, where memory locations F000 through C700 are cleared after the first math table is loaded into memory.

7. The universal interface application of claim 1, where the second math table uses values from the first math table.

8. The universal interface application of claim 1, further comprising where the second math table uses Madelung's constants to determine values for the second math table.

9. The universal interface application of claim 1, where the third math table uses values that support execution of the software application's shells.

10. The universal interface application of claim 1, where the third math table uses a Fourier Transform function.

11. The universal interface application of claim 10, where the software application supports transmission of data packets.

12. The universal interface application of claim 1, where the third math table uses a Cosine Transform function.

13. The universal interface application of claim 12, where the software application operates in an environment necessitating precise bandwidths.

14. The universal interface application of claim 1, where the third math table uses a Sine Transform function.

15. The universal interface application of claim 14, where the software application operates in an environment necessitating data compression.

16. A universal interface application, comprising:
   identifying system hardware components;
   using Feigenbaum constants to determine values for a first math table and loading the values into memory;
   loading values from implementation of a second math table using functions from the first math table into the memory;
   loading values from implementation of a third math table into the memory;
   selecting a system manager and optimizing conventional memory; and
   executing a software application by implementing functions from the first, second and third math tables.

17. The universal interface application of claim 16, where the Feigenbaum constants are parameterized by logical maps.

18. The universal interface application of claim 16, where the Feigenbaum constants have fixed points $f$ obtained by solving the equation $x=f(x)$.

19. The universal interface application of claim 18, where a hexadecimal value represents $f(x)$.

20. The universal interface application of claim 18, where input/output values of the first math table are decimal values.

21. The universal interface application of claim 16, where memory locations F000 through C700 are cleared after the first math table is loaded into memory.

22. The universal interface application of claim 16, where the second math table uses values from the first math table.

23. The universal interface application of claim 16, further comprising the second math table uses Madelung's constants to determine values for the second math table.

24. The universal interface application of claim 16, where the third math table uses values that support execution of the software application's shells.

25. The universal interface application of claim 24, where the software application supports transmission of data packets.

26. The universal interface application of claim 16, where the third math table uses a Cosine Transform function.

27. The universal interface application of claim 26, where the software application operates in an environment necessitating precise bandwidths.

28. The universal interface application of claim 16, where the third math table uses a Sine Transform function.

29. The universal interface application of claim 28, where the software application operates in an environment necessitating data compression.

30. A universal interface program capable of executing applications across operating system platforms, comprising:
   identifying system hardware components;
   using Feigenbaum constants to determine values for a first math table and loading the values into memory;
   loading the values of the first math table to activate memory locations and compiling the first math table to the memory;
   using Madelung's constants to determine values for a second math table;
   loading values from implementation of a second math table using functions from the first math table into the memory;
   loading values from implementation of a third math table into the memory;
   selecting a system manager and optimizing conventional memory;

implementing a methodology capable of reading root directories and software applications as if in original shell design; and executing a software application by implementing functions from the first, second and third math tables.

31. The universal interface application of claim 30, where the Feigenbaum constants are parameterized by logical maps.

32. The universal interface application of claim 30, where the Feigenbaum constants have fixed points $f$ obtained by solving the equation $x=f(x)$.

33. The universal interface application of claim 32, where a hexadecimal value represents $f(x)$.

34. The universal interface application of claim 32, where input/output values of the first math table are decimal values.

35. The universal interface application of claim 30, where memory locations F000 through C700 are cleared after the first math table is loaded into memory.

36. The universal interface application of claim 30, where the second math table uses values from the first math table.

37. The universal interface application of claim 30, further comprising the second math table uses Madelung's constants to determine values for the second math table.

38. The universal interface application of claim 30, where the third math table uses values that support execution of the software application's shells.

39. The universal interface application of claim 30, where the third math table uses a Fourier Transform function.

40. The universal interface application of claim 39, where the software application supports transmission of data packets.

41. The universal interface application of claim 30, where the third math table uses a Cosine Transform function.

42. The universal interface application of claim 41, where the software application operates in an environment necessitating precise bandwidths.

43. The universal interface application of claim 30, where the third math table uses a Sine Transform function.

44. The universal interface application of claim 43, where the software application operates in an environment necessitating data compression.

45. A universal interface program for executing applications comprising:

performing a POST operation;

identifying system hardware components;

using Feigenbaum constants to determine values for a first math table and loading the values into memory;

loading the values of the first math table to activate memory locations and compiling the first math table to the memory;

clearing the memory in certain locations;

using Madelung's constants to determine values for a second math table;

loading values from implementation of a second math table using functions from the first math table into the memory;

loading values from implementation of a third math table into the memory;

selecting a system manager and optimizing conventional memory;

implementing a methodology capable of reading root directories and software applications as if in original shell design; and executing a software application by implementing functions from the first, second and third math tables.

46. The universal interface application of claim 45, where the Feigenbaum constants are parameterized by logical maps.

47. The universal interface application of claim 45, where the Feigenbaum constants have fixed points $f$ obtained by solving the equation $x=f(x)$.

48. The universal interface application of claim 47, where a hexadecimal value represents $f(x)$.

49. The universal interface application of claim 47, where input/output values of the first math table are decimal values.

50. The universal interface application of claim 45, where clearing of the memory in certain locations occurs in areas F000 through C700.

51. The universal interface application of claim 45, where the second math table uses values from the first math table.

52. The universal interface application of claim 45, further comprising the second math table uses Madelung's constants to determine values for the second math table.

53. The universal interface application of claim 45, where the third math table uses values that support execution of the software application's shells.

54. The universal interface application of claim 45, where the third math table uses a Fourier Transform function.

55. The universal interface application of claim 54, where the software application supports transmission of data packets.

56. The universal interface application of claim 45, where the third math table uses a Cosine Transform function.

57. The universal interface application of claim 56, where the software application operates in an environment necessitating precise bandwidths.

58. The universal interface application of claim 45, where the third math table uses a Sine Transform function.

59. The universal interface application of claim 58, where the software application operates in an environment necessitating data compression.

60. The universal interface application of claim 45, further comprising ensuring that variables are not set with denominative values.

61. The universal interface application of claim 45, further comprising optimizing convention memory locations.

62. The universal interface application of claim 45, further comprising implementing a standard registry.

63. A universal interface application, comprising:

loading values based on a means for a first math table into a memory means where the means for the first math tables uses Feigenbaum constants to determine the values for the means for the first math table;

loading values from implementation of a means for a second math table using functions from the means for the first math table into the memory means;

loading values from implementation of a means for a third math table into the memory means; and executing a means for a software application by implementing functions from the means for the first, second and third math tables.

64. The universal interface application of claim 63, where the Feigenbaum constants are parameterized by logical maps means.

65. The universal interface application of claim 63, where the Feigenbaum constants have fixed points $f$ obtained by solving the equation $x=f(x)$.

66. The universal interface application of claim 65, where a hexadecimal value represents $f(x)$.

67. The universal interface application of claim 65, where input/output values of the means for the first math table are decimal values.

68. The universal interface application of claim 63, where memory locations F000 through C700 are cleared after the means for the first math table is loaded into memory means.

69. The universal interface application of claim 63, where the means for the second math table uses values from the means for the first math table.

70. The universal interface application of claim 63, further comprising the means for the second math table uses Madelung's constants to determine values for the means for the second math table.

71. The universal interface application of claim 63, where the means for the third math table uses values that support execution of the means for the software application's shells.

72. The universal interface application of claim 63, where the means for the third math table uses a Fourier Transform function.

73. The universal interface application of claim 74, where the software application supports transmission of data packets.

74. The universal interface application of claim 63, where the means for the third math table uses a Cosine Transform function.

75. The universal interface application of claim 74, where the software application operates in an environment necessitating precise bandwidths.

76. The universal interface application of claim 63, where the third math table uses a Sine Transform function.

77. The universal interface application of claim 76, where the software application operates in an environment necessitating data compression.

78. A computer-readable medium having computer executable instructions for performing steps, comprising:
- loading values based on a first math table into memory where the values are determined from Feigenbaum constants;
- loading values from implementation of a second math table using functions from the first math table into the memory;
- loading values from implementation of a third math table into the memory; and
- executing a software application by implementing functions from the first, second and third math tables.

79. The universal interface application of claim 16, where the third math table uses a Fourier Transform function.

80. The universal interface application of claim 45, where the third math table is loaded on system start up.

* * * * *